L. T. RASMUSSEN.
FURROW OPENER.
APPLICATION FILED MAR. 8, 1909.
942,283.
Patented Dec. 7, 1909.
2 SHEETS—SHEET 2.
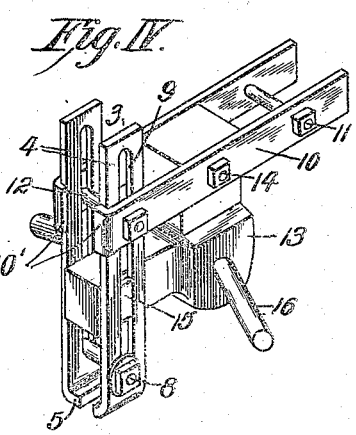
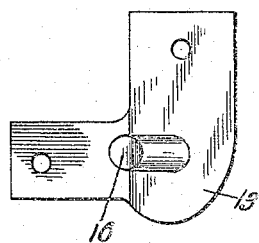
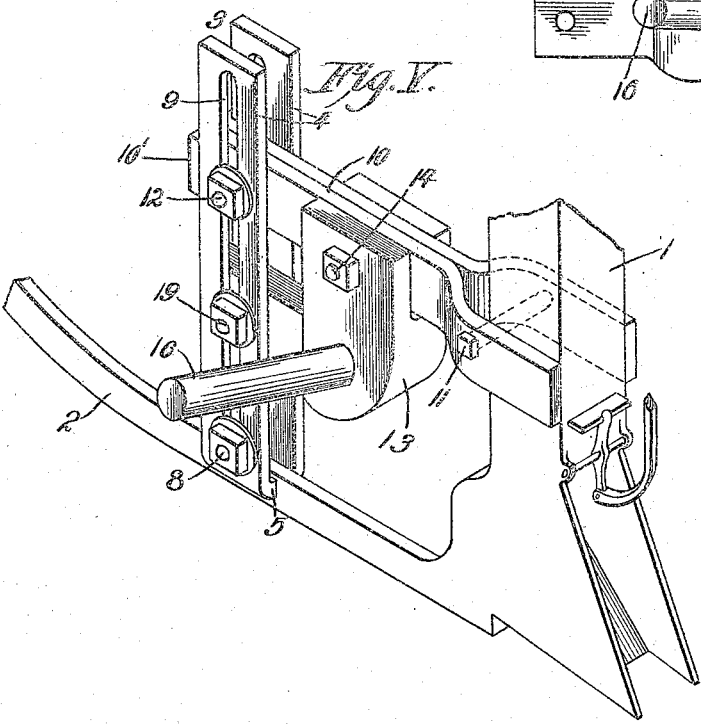
Witnesses.
E. H. Cahill.
Myrtle M. Jackson
Inventor.
Laurits T. Rasmussen
By
Attorney.

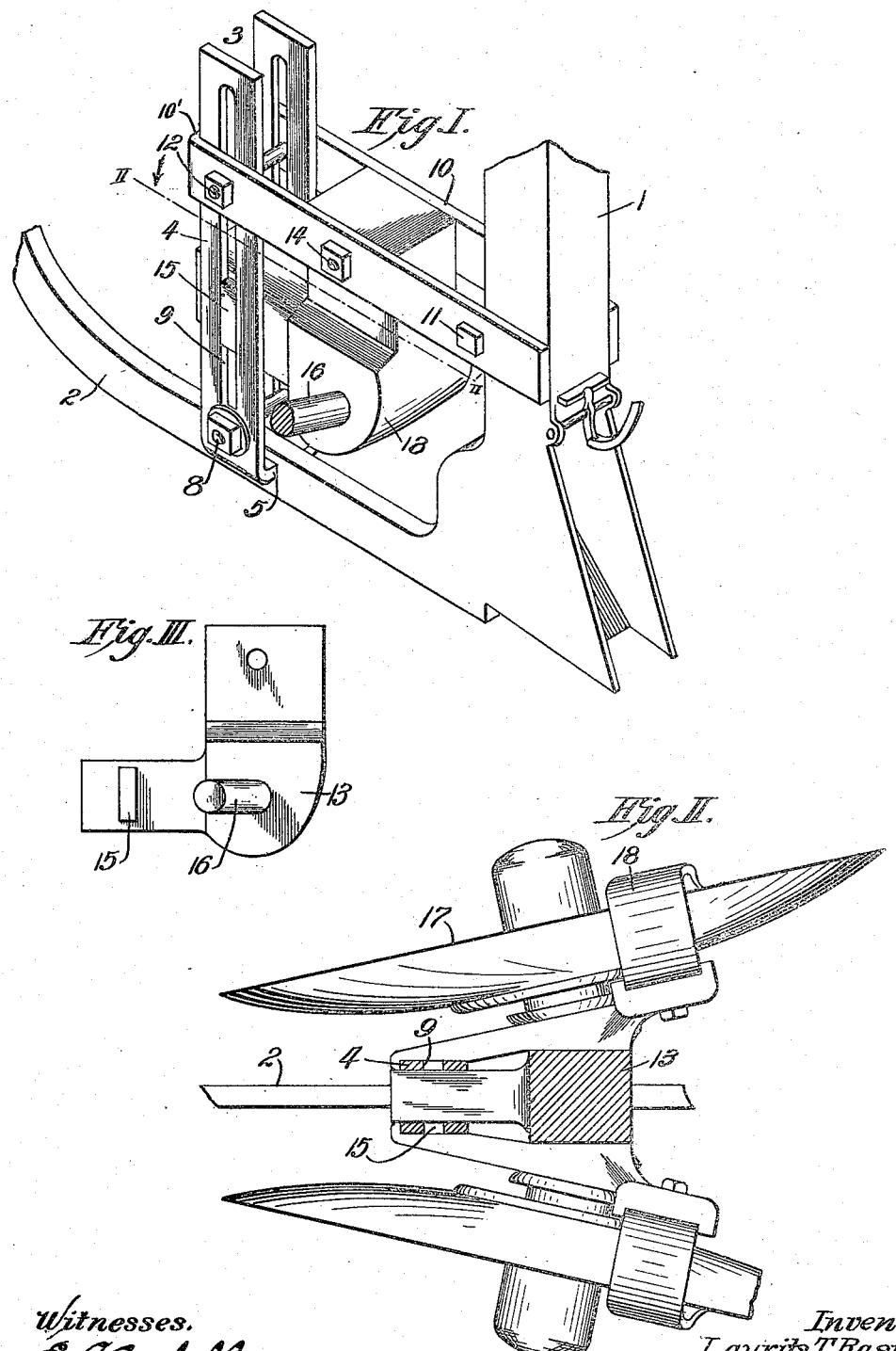

UNITED STATES PATENT OFFICE.

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

942,283.  Specification of Letters Patent.  Patented Dec. 7, 1909.

Application filed March 8, 1909.  Serial No. 481,935.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to furrow openers and has for its object to provide a device of that class which may be attached to a planter of ordinary construction, and which comprises the improved details of structure hereinafter described and pointed out in the claims, reference being had to the accompanying drawings, in which:—

Figure I is a perspective view of a planter seed tube and shoe equipped with a furrow opener constructed according to my invention, the opener disks being removed for better illustration. Fig. II is a horizontal sectional view on the line II—II, Fig. I, the opener disks being applied to the head block. Fig. III is a detail view of the head block in side elevation. Fig. IV is a front perspective of the furrow opener minus the opener disks. Fig. V is a perspective view of the seed tube and shoe, equipped with a modified form of my furrow opener minus the disks. Fig. VI is a view in side elevation of the modified form of head block.

Referring more in detail to the parts:— 1 designates a seed tube and 2 the shoe of a planter of ordinary construction, such parts, in themselves, forming no part of my present invention, but being illustrated to show the application of my improved furrow opener thereto.

3 designates a standard preferably comprising a pair of bars 4 which extend on opposite sides of the planter shoe and have lip portions 5 at their lower ends which frictionally engage said shoe and may be tightened thereagainst by a bolt 8 which rests upon the shoe.

9 designates slots which extend substantially throughout the length of the bars 4, and 10 designates arms which are adapted to engage the seed tube 1, at the rear, and the standard 3, at their forward ends, a bolt 11 being extended through both of the arms 10, adjacent to the seed tube, and a bolt 12 being extended through the outer ends of the arms and through the slots 9 in the standard bars. Arms 10 are preferably provided with lips 10' on their forward ends, which project laterally over and engage the forward edges of the standard bars 4.

13 designates a head block, the upper end of which is projected between the arms 10 and connected therewith by a bolt 14 and the forward end of which is projected between the standard bars and provided with laterally projecting lugs 15 which extend into the bar slots 9.

16 designates axles which extend laterally from the head block 13 and carry the furrow opening disks 17 and the cleaner blades 18.

In the modified form of the opener, which is illustrated in Figs. V and VI, the arms 10 are projected between, instead of on the outside of the standard bars, the upper portion of the head block 13 is provided with a slot for receiving said arms, and the forward section of the head block is provided with an aperture for receiving a bolt 19 that extends through the standard slots and aperture, the operation and general construction of the device being similar, however, in both the preferred and modified forms.

In assembling the furrow opener, the arms 10 are fitted over the head block 13 and secured thereto by means of the bolt 14, the standard bars 4 are connected with the arms 10 by means of the bolt 12 and with the lugs 15 projected through the vertical slots 9. The arms 10 are then fitted over the sides of the seed tube and the standard bars over the planter shoe, and the bolts 11 and 8 tightened to secure the arm and bar parts to their respective mountings.

By adjustment of the arms 10 on the seed tube and standard bars, the disks 17 may be adjusted to proper height for cutting a furrow of a desired depth.

During the operation of the planter, the head block is held against displacement by its positive connection with the arms 10 and the lug and slot connection with the standard bars, so that a stable mounting is provided without affecting the vertical adjustment of the disks.

Having thus described my invention, what

I claim as new therein and desire to secure by Letters Patent is:—

1. A furrow opener comprising a standard provided with vertical slots passing therethrough from side to side, and arms having adjustable connection with said standard, of a head block having a vertical portion adapted for connection with said arms, and a horizontal portion extended into proximity to said standard, and means projecting from said horizontal portion into the standard slots and adapted for anchoring the head block thereto.

2. The combination with a planter seed tube and shoe of a standard carried by said shoe and provided with longitudinal slots, arms adjustably connected with said standard and having frictional engagement with said seed tube, a head block carried by said arms and having a portion extended between the standard members, and wings on the extended portion of said head block and extending into the standard slots.

3. The combination with a planter seed tube and shoe, of a standard comprising longitudinally slotted bars having frictional engagement with said shoe at their lower ends, arms embracing said seed tube and standard, and having a bolt extending therethrough and through the slots in the standard bars, a head block having an upper portion projected between and secured to said arms, and a forward portion projected between the standard bars, wings on said forward block portion and extending into the slots in said standard bars, and disks revolubly mounted on said head block, for the purpose set forth.

4. The combination with a planter seed tube and shoe, of a standard clamped to said shoe and provided with longitudinal slots, arms clamped to the seed tube and extending toward said standard and provided with lips that overlie the forward edge of the standard, a head block having one portion secured to said arms and a forward member having lips projected into the standard slots, and disks carried by said head block.

In testimony whereof I affix my signature in presence of two witnesses.

LAURITS T. RASMUSSEN.

Witnesses:
W. I. WALKER,
FRANK E. WALKER.